Dec. 18, 1934.   R. K. LEE   1,984,414
MEANS FOR COATING METAL ARTICLES
Original Filed Feb. 1, 1930
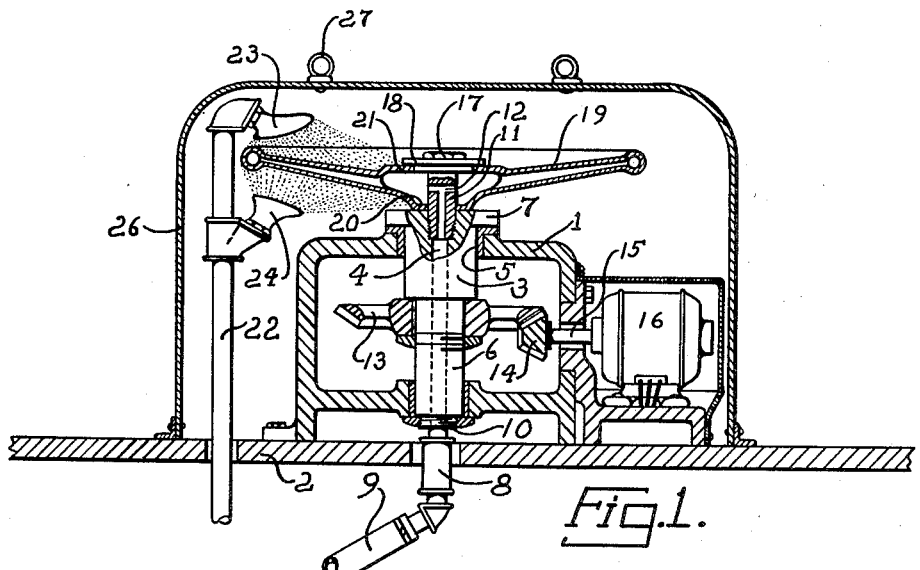
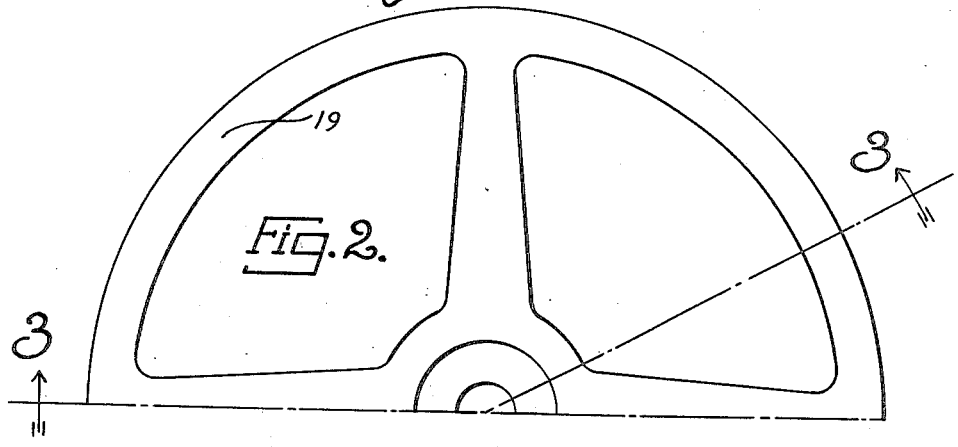
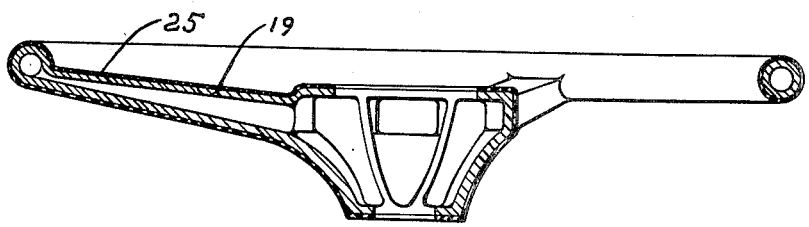
INVENTOR
ROGER K. LEE.
BY
ATTORNEY Patented Dec. 18, 1934

1,984,414

UNITED STATES PATENT OFFICE 1,984,414

MEANS FOR COATING METAL ARTICLES

Roger K. Lee, Highland Park, Mich., assignor to Chrysler Corporation, Detroit, Mich., a corporation of Delaware Original application February 1, 1930, Serial No. 425,311. Divided and this application May 12, 1934, Serial No. 725,395

4 Claims. (Cl. 91—55)

This invention relates to means for coating metal articles and it is a division of my co-pending application Serial No. 425,311.

The main objects of this invention are to provide an improved method for coating articles, particularly steering wheels; to provide a method of this kind by which successive coatings, such as coatings of hard rubber compositions may be applied and hardened or cured in rapid sequence; to provide an improved means for heat treating successively applied thin layers of coating materials; and to provide means of this kind by which a rubber coating is cured substantially uniformly throughout its entire thickness.

An illustrative embodiment of my invention is shown in the accompanying drawing, in which:

Fig. 1 is a central vertical section of my improved coating apparatus.

Fig. 2 is a fragmentary elevation of a rubber coated steering wheel.

Fig. 3 is a section taken on line 3—3 of Fig. 2.

In the form of my invention shown, the coating apparatus comprises a stationary support or housing 1 which is mounted on a base or floor member 2. Journaled in the housing 1 is a rotatable support 3 which has a central passage 4. The rotatable member 3 is journaled in bearings 5 and 6 at its respectively opposite ends and is supported by a flange 7 on its upper end. The lower end of the passage 4 communicates with an inlet pipe 8 through which steam or other suitable heating medium is supplied to the passage 4 by a pipe 9. A packing gland 10 forms a seal between the inlet 8 and the lower end of the rotatable support 4 so as to prevent leakage of the heating medium.

A plug 11 having a branched passage 12 communicating at one end with the passage 4 of the rotatable support is threaded in the upper end of said passage. Rigidly mounted on the intermediate part of the rotatable support 3 is a bevel gear 13 which meshes with a pinion 14 on the shaft 15 of an electric motor 16.

The plug 11 extends beyond the upper end of the rotatable support 3 and has a nut 17 and washer 18 on its extremity by means of which a tubular steering wheel core 19 is rigidly secured to the support member 3 so as to rotate in unison therewith. The outlets of the branched passage 12 of the plug 11 communicate with the interior of the steering wheel so as to discharge heating medium thereinto. The lower side 20 of the hub of the wheel is seated upon the top of the flange 7 of the rotatable support 3 and the washer 18 is seated upon the upper side 21 of the hub so as to prevent leakage of heating medium from the apertures through which the plug 11 extends.

Adjacent the periphery of the steering wheel core 19 is an upright pipe 22 through which a liquid coating composition is supplied to a pair of spray nozzles 23 and 24 which are located above and below the steering wheel core respectively. The entire spraying, rotating and heating apparatus is enclosed within a removable casing or dome 26 which may be lifted by the eyes 27 and removed from the apparatus while the core 19 is being replaced.

Any suitable composition of hard rubber solutions may be introduced into the pipe 22 under pressure. A rubber composition consisting of substantially 100 parts of pure rubber, 50 parts of sulphur and 40 parts of lime produces a suitable spraying composition when dissolved in benzol.

In operation, the rotatable support 3 and core 19 are rotated in unison with each other by the motor 16 and gears 13 and 14 while steam is introduced into the interior of the steering wheel core through the passages 4 and 12. The nozzles 23 and 24 apply the coating composition, preferably a rubber solution, to a limited portion of the core as it is rotated and internally heated. One complete rotation of the core produces a layer of rubber which is rapidly cured and caused to bond to the metal by the internally supplied heating medium. Subsequent rotations of the wheel produce superimposed layers which are in turn cured by heat from within the core. A coating 25 of a desired thickness may be applied to the core 19 in this manner and by properly timing the speed of rotation of the core with respect to the curing period required, one layer may be completely cured before the next successive layer is applied.

Articles which will not permit of internal heating may be heated either in the coating chamber by passing heated air therethrough or they may be heated in a furnace before they are mounted for rotation relative to the spray nozzles. When internal heating is employed the coating may be cured by continuing the supply of steam after the discharge of the coating compound has been discontinued and when the articles are not internally heated, they may be removed and cured by a separate heat treatment.

Although but one specific embodiment of this invention has herein been shown and described, it will be understood that various changes including the size, shape and arrangement of parts, may be made without departing from the spirit of my invention and it is not my intention to limit its scope other than by the terms of the appended claims.

What I claim is:

1. Apparatus for coating wheels comprising a rotatable support, means for securing a hollow wheel core on said support including a member detachably secured to said support and core for fixing the latter to said support and having a passage for supplying heating medium to the interior of said core, a driving member for rotating said core, and a pair of spray nozzles, one above and the other below said core for applying a coating composition thereon.

2. Apparatus for coating a hollow article including a stationary support, a rotatable support journaled on said stationary support having a passage therein, one end of said passage being in communication with a source of heating medium, means detachably securable to said rotatable support and receivable in a passage extending through said article for securing the latter on said rotatable support and having a passage communicating with the passage of the latter and with the interior of said article and including a member for sealing one end of the passage of said article, and sprays for applying a coating composition on a limited portion of said article during rotation thereof.

3. Apparatus for coating a hollow wheel core including a stationary support, a rotatable support journaled on said stationary support having a passage therein, one end of said passage being in communication with a source of heating medium, means detachably securable to said rotatable support and receivable in a central passage in said core for securing the latter on said rotatable support and having a passage communicating with the interior of said core and passage of said rotatable support; a driving member for rotating said rotatable support and said core, sprays for applying a coating composition on a limited portion of the core during rotation thereof, and an enclosure surrounding said apparatus.

4. Apparatus for coating a hollow wheel core including a rotatable support having a surface substantially normal to its axis for engaging one side of the hub portion of said core and sealing the corresponding end of the hub passage thereof, said support having a passage communicating at one end wth a source of heating medium, a fixture detachably securable to the hub portion of said core and to said support having a passage for supplying said heating medium to the interior of said core and including a member engageable with the other side of the hub portion of said core for sealing the corresponding end of the hub passage thereof and adapted to maintain the first mentioned side of said hub portion in sealed engagement with said surface of said support, a driving member for rotating said support, and sprays for applying a coating composition on the external surface of said core during rotation thereof.

ROGER K. LEE.